UNITED STATES PATENT OFFICE.

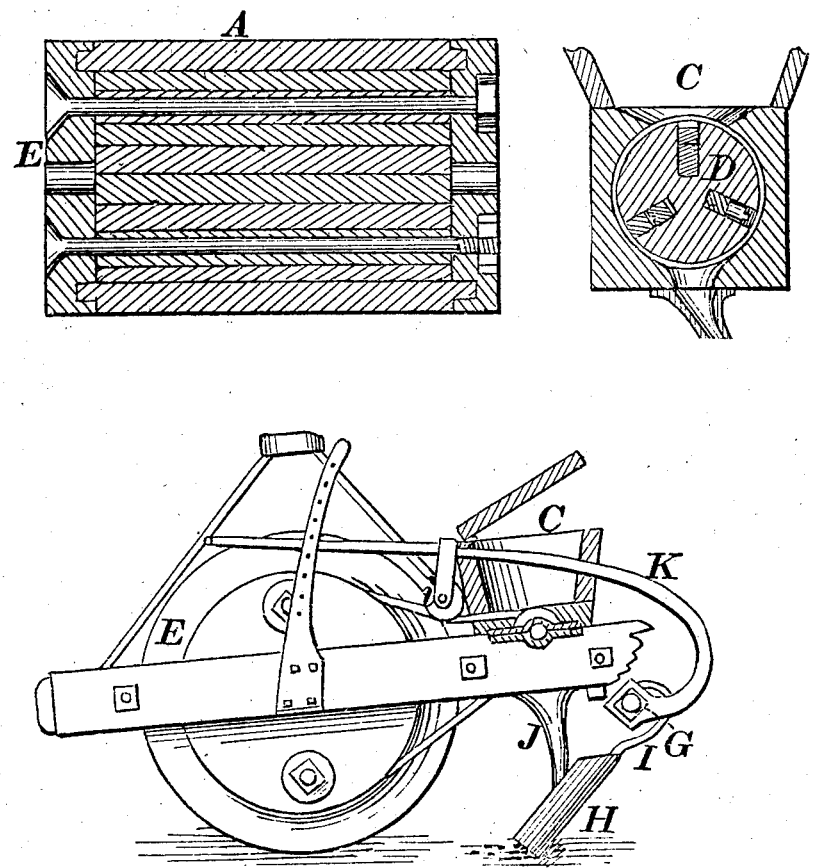

THOMAS D. AYLSWORTH, OF PINE BEND, MINNESOTA.

IMPROVEMENT IN GRAIN-DRILLS.

Specification forming part of Letters Patent No. 38,275, dated April 28, 1863.

*To all whom it may concern:*

Be it known that I, THOMAS D. AYLSWORTH, of Pine Bend, in the county of Dacotah and State of Minnesota, have invented a new and Improved Grain-Drill; and I do hereby declare that the following is a full, clear, and exact description thereof, reference being had to the accompanying drawings, in which—

Figure 1 is a perspective view, Fig. 2 a side elevation, and Fig. 3 a top view, of seed hopper and cylinder; Fig. 4, a detailed view of the drill-tube; Fig. 5, a transverse vertical section of seed hopper and cylinder; Fig. 6, a vertical longitudinal section of one of the bearing-rollers.

Like letters indicate corresponding parts in all the figures.

The nature of my invention consists in mounting a grain-drill upon rollers of an improved construction, in combination with drill-tubes peculiarly made and attached to the frame by means of springs.

It further consists in a very simple and efficient device for raising said tubes from the ground, and at the same time causing the flow of seed to cease, and also in various combinations of these and other features of the machine.

To enable others skilled in the art to make and use my machine, I will proceed to describe its construction and operation.

A A represent two rollers, which are constructed as follows, viz: Cast-iron heads are made for the ends, which heads E are provided with a recess or groove, *e*, on one face near the periphery, into which the ends of planks forming the shell or body of the roller are fitted in such a way that the outer surface of said planks shall be even with the periphery of the iron heads, as fully shown in Fig. 6. The heads E are furnished with holes, through which rods *f* extend, said rods being provided with a head at one end and a nut at the opposite end, by means of which the heads E, at opposite ends of the roller, are drawn tightly toward each other, thus holding the planks forming the shell or body firmly in place. A rectangular frame, B, is then mounted on these rollers by means of an axle or rod extending through the center of the rollers longitudinally, and having its bearings in the side pieces of the frame B.

On the front part of the frame B is mounted a seed-hopper, C, constructed in the ordinary manner, in the lower portion of which is placed a seed-cylinder, D, provided with adjustable-sized cells *a*. The shaft of this cylinder extends through one end of the hopper, and is provided with a pulley, *o*, to which motion is given by means of a cord or chain, *h*, driven by a pulley, F, attached to one of the main rollers A, as shown in Figs. 1 and 2.

A rock-shaft, G, is attached to frame B underneath at its front end, to which the drill-tubes H are attached by means of springs I I. These tubes are made of strips of sheet metal bent into V shape, as shown in Fig. 4; or they may be made of cast-iron, if preferred. The springs I are made of any suitable material, and are attached at one end to the upper end of tubes H. Their opposite ends, being spread apart, are then curved, as shown in Fig. 4, and attached rigidly to rock-shaft G, as shown in Figs. 1 and 2. The object of having two springs and of spreading them asunder where they are attached to the shaft G is to brace the tubes H laterally, and thus prevent them from being displaced by clods or other obstructions. The tubes H are placed in an inclined position, as shown in Fig. 2, with their open side uppermost, forming a channel for the flow of the seed from the tube J to the ground. By being thus placed they readily pass over roots, stones, clods, &c., without catching, and thus obviate all danger of breakage or stoppage from that source. The point of the V-shaped portion also is held upon the ground, and by the pressure of the springs I I it is forced into the ground as it passes along, thus forming a groove or furrow for the reception of the seed and raising small ridges of loose earth at each side of the furrow, a portion of which loose earth falls back again after the tube has passed, and thus covers the seed, the remaining portion being pressed down by the rollers A as they advance.

To the under side of the seed-hopper, and corresponding with the openings therein and with the cells in the cylinder D, a series of flexible tubes, J, are attached for the purpose of receiving the seed as it falls from the cells *a* and conveying it to the tubes H, by which it is delivered in the grooves or furrows formed for it in the ground by said tubes H.

The rock-shaft G is provided with a hand-lever, K, as shown clearly in Fig. 2. This lever is attached rigidly to the shaft G, and is curved upward and backward, extending past the seat M, its rear portion passing through an opening in a guide-bar, L, which bar is provided with a series of holes and a pin or other equivalent means for holding the lever in any required position. Near its center the lever K has attached to it a small pulley, $i$, mounted in proper bearings, which pulley moves with the lever, and is used for tightening the cord $h$, and thereby to cause the seed-cylinder D to rotate when desired. As the seed-tubes H and lever K are both attached to rock-shaft G, it will be seen that by depressing the lever K the tubes H are forced down upon the ground, and the cord $h$ being tightened at the same time, the cylinder is caused to revolve, and thus the machine is put in operation by this single movement of the lever, and is as readily caused to cease operating by the reverse movement of the lever.

By means of the screws in the bottom of the cells $a$ of the cylinder D the cells may be varied in size, so as to sow more or less seed, as may be required, or they may be adjusted for sowing various kinds of seed. By means of the springs I the tubes H are kept constantly in contact with the ground when in operation, thus perfectly adapting themselves to the inequalities of the ground and insuring the proper planting of the seed.

It is obvious that one roller A may be used instead of two, but two are preferable for convenience in turning and operating.

From the foregoing description the operation will be readily seen. The hopper C is provided with the requisite kind and quantity of seed, the cells having been previously adjusted to the proper size, and the driver, being mounted upon seat M, depresses the lever K, thereby bringing the tubes H upon the ground and tightening the cord $h$, by which the seed-cylinder is made to revolve as the machine is drawn along, thus delivering the seed from the hopper into the tubes H, from whence it flows in a steady uniform steam into the furrow made by the point of tube H in the ground. As the machine moves forward the rollers A pass over the seed thus sown, and, pressing down the small ridges of earth raised by the formation of the furrows, cover the grain, and at the same time press the earth in close contact with the seed, thereby greatly facilitating the process of germination, and also leaving the surface of the field in a smooth condition, greatly aiding the passage of the reaping-machine in harvesting the crop.

Having thus described my invention, what I claim, and desire to secure by Letters Patent, is—

1. The V-shaped drill-teeth H, attached to the rock-shaft G by means of the springs I I, in the manner and for the purpose set forth.

2. The combination of the teeth H, rock-shaft G, and lever K, provided with the pulley $i$, as and for the purposes above described.

3. The combination of the teeth H, tubes J, and seed-rollers D, provided with adjustable cells, as above set forth.

4. Mounting a seeding-machine provided with the teeth H, rock-shaft G, and lever K upon rollers A A, in the manner and for the purposes above set forth.

THOS. D. AYLSWORTH.

Witnesses:
CHARLES E. HOBBY,
D. STEPHENSON.